(12) United States Patent
Tallam et al.

(10) Patent No.: US 9,182,990 B1
(45) Date of Patent: Nov. 10, 2015

(54) METHOD AND APPARATUS FOR DETECTING EXECUTION OF UNSUPPORTED INSTRUCTIONS WHILE TESTING MULTIVERSIONED CODE

(71) Applicant: GOOGLE INC., Mountain View, CA (US)

(72) Inventors: Sriraman Tallam, Mountain View, CA (US); Paul Pluzhnikov, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/321,308

(22) Filed: Jul. 1, 2014

(51) Int. Cl.
*G06F 9/44* (2006.01)
*G06F 9/30* (2006.01)
*G06F 11/36* (2006.01)

(52) U.S. Cl.
CPC ........ *G06F 9/30174* (2013.01); *G06F 11/3664* (2013.01)

(58) Field of Classification Search
IPC .......................... G06F 9/30174,11/3636, 9/455
See application file for complete search history.

(56) References Cited

U.S. PATENT DOCUMENTS

| 7,065,633 | B1* | 6/2006 | Yates et al. | 712/227 |
| 2008/0114937 | A1* | 5/2008 | Reid et al. | 711/117 |
| 2011/0119659 | A1* | 5/2011 | Peterson | 717/148 |

* cited by examiner

*Primary Examiner* — Tuan Vu
(74) *Attorney, Agent, or Firm* — Birch, Stewart, Kolasch & Birch, LLP

(57) ABSTRACT

A system and method for detecting execution of unsupported instructions while testing multiversioned functions within software application code are disclosed. An example method includes annotating a software application's executable binary to distinguish functions that are directed to particular hardware variations. Functions with instructions that are unsupported by a simulated hardware platform variation on which the software application's annotated executable binary will run may then be detected. The contents of the detected functions may be rewritten with trap instructions. At runtime, when executing the software application on the simulated hardware platform variation running on a different physical hardware platform variation, responsive to execution of a function with instructions that are unsupported by the simulated hardware platform, terminating the software application based on the execution of the trap instructions. Execution of unsupported instructions may be detected based on the termination of the software application.

20 Claims, 6 Drawing Sheets

```
int foo_default()
{
    // default instructions that work on all versions
    ...
}                                                           ⎬ 1 int foo_X
{
    // instructions for hardware variant X
    ISA X
    x86 basic instructions
    ...
}                                                           ⎬ 2 int foo_Y
{
    // instructions for hardware variant Y
    ISA Y
    AVX x86 instructions
    ...
}                                                           ⎬ 3 int foo_dispatcher()
{
    if(__builtin_cpu_is("Y"))
        foo = &foo_Y;
    else
    if(__builtin_cpu_is("X"))
        foo = &foo_X;
    else
        foo = &foo_default;
}                                                           ⎬ 4 int bar()
{
    foo();
} int __builtin_cpu_is(const char *name)
{
    //CPU identification library function.
    Query CPU type.
    ...
}
```

FIG. 2

ISA.X:
foo_X
ISA.Y:
foo_Y

FIG. 4A

ISA.AVX
//AVX instructions

ISA. SSE4_1
//SSE4_1
instructions

FIG. 4B

METHOD AND APPARATUS FOR DETECTING EXECUTION OF UNSUPPORTED INSTRUCTIONS WHILE TESTING MULTIVERSIONED CODE

BACKGROUND

Different execution platforms, such as central processing units (CPU), may support different feature sets for software applications. For example, a new version of a CPU may support more advanced features in software applications than an older version. As illustrated in FIGS. 1A and 1B, Intel Pentium II Processor does not support the more advanced SSE instructions of the Intel Pentium III Processor. Applications may be written to include functions that take advantage of advanced features in newer execution platforms which makes the applications execute faster. However, these applications may also need to be compatible with older versions of the platforms. To address the need for specific versions of functions in software applications, multiversioned code may be written that contains multiple different versions of a function. Multiversioned code may contain several versions of a function that are semantically identical.

Frequently-executed functions in software applications are sometimes compiled into several different versions to take advantage of specific advanced features present in some hardware versions and to allow the software application to be compatible with older variants of hardware on which the applications are executed. Each version of the function may be written to support and execute on a specific execution platform. This function multiversioning allows for the creation of a single application executable binary that can execute on variants of a specific hardware platform while taking advantage of advanced features that are only available on certain variants of the platform.

It is somewhat difficult to test all versions of a multiversioned function. Running the function once will only exercise a specific version of the function leaving the other function versions untested. This option limits code coverage and lets bugs in versioned functions go undetected.

One simple solution to the testing problem is to let an executable with multiversioned functions run on all possible variants of hardware for which specialized versions were created. However, testing on all physical hardware variations of a platform is simply not feasible or cost-effective. Therefore, platforms are simulated in software to mimic the behavior of hardware variants for platforms.

Simulating the platform solves the problem of code coverage testing. However, this method of testing may introduce a new problem. The multiversioned code may contain some instructions that always get executed, regardless of the platform variation on which the function is run. For instance, a program may execute a piece of code containing advanced instruction without checking for the appropriate run-time support of the executing platform. This unchecked execution may be a bug that simulation simply does not detect. Although these instructions may be supported by some variations of the platform, the instructions may not be supported by all variations of the platform. If a program executes a piece of code containing advanced instructions without checking for the appropriate run-time support on the executing platform, the program will crash on platforms that do not support these advanced features. With simulation, this execution may succeed as the real platform on which the simulation executes may support the advanced features. In other words, the simulated testing does not always identify or detect all versioning errors. As recognized by the inventors, there should be a method of testing multiversioned functions that detects the execution of unsupported instructions on a simulated platform regardless of the functionality of the underlying platform that is executing the test.

SUMMARY

This specification describes technologies relating to testing applications in general, and specifically to methods and systems for detecting execution instructions that are unsupported on a simulated platform, but are supported by the physical hardware running the simulated platform.

In general, one aspect of the subject matter described in this specification can be embodied in a system, non-transitory computer-readable medium, and method for detecting execution of unsupported instructions while testing multiversioned functions within software application code. An example system includes one or more processing devices and one or more storage devices storing instructions that, when executed by the one or more processing devices cause the one or more processing devices to execute an example method. An example non-transitory computer-readable medium stores computer executable code that causes one or more processors to execute the steps of an example method. An example method includes: annotating a software application's executable binary to distinguish functions that are directed to particular hardware variations; detecting a function with instructions that are unsupported by a simulated hardware platform variation on which the software application's annotated executable binary will run; rewriting the contents of the detected function with trap instructions; at runtime, when executing the software application on the simulated hardware platform variation running on a different physical hardware platform variation, responsive to execution of the function with instructions that are unsupported by the simulated hardware platform, terminating the software application based on execution of the trap instructions; and detecting execution of unsupported instructions based on the termination of the software application.

These and other embodiments can optionally include one or more of the following features. Annotating a software application's executable binary may be done by creating specially named sections to denote functions by hardware platform variation and listing each function directed to the specific hardware platform variation under its corresponding named section. Execution of the software application may be repeated using different simulated hardware platform variations until all execution paths have been executed and tested. Trap instructions may be interrupts or exceptions. Detecting a function with instructions that are unsupported by the simulated hardware platform variation using the software application's annotated executable binary may include using a special piece of code that identifies the sections that contain functions with unsupported instructions for the simulated hardware platform variation. Rewriting the contents of the detected function with trap instructions may be done after the software application's annotated executable binary is loaded into memory leaving the contents of the executable binary on disk unchanged. Annotating a software application's executable binary to distinguish functions that are directed to a particular hardware variation may be done by a compiler. A dispatcher function may be called at run-time that determines which version of a function to execute based on the simulated hardware platform variation on which the software application is executing. Prior to detecting a function with instructions that are unsupported by a simulated hardware platform variation on which the software application's annotated executable binary will run, a determination may be made as to whether a simulation is being run and the simulated hardware platform variation may be determined if a simulation is being run.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 2 is an example of a multiversioned function.

FIG. 4a is an example of ISA sections created by an example compiler based on the multiversioned functions of FIG. 2.

FIG. 4b is an example of ISA sections created by an example compiler

DETAILED DESCRIPTION

Functions may be multiversioned for various reasons. For the context of this disclosure, the scope of function multiversioning is limited to taking advantage of specialized features available in hardware variants. There may be two types of multiversioned functions that are generated for hardware variants: (1) multiversioned functions that have specialized versions which can run on any hardware variant that can execute the default version(s) of the function and (2) multiversioned functions that have specialized versions which cannot run on older hardware variants even if the older hardware variants can execute the default version(s) of the function.

An example of a multiversioned function that can run on any hardware variants is a function for particular CPU variants of popular processor architectures that are known to have larger execution latencies when a certain pattern of instructions is present in the function. A function version may be created for an older hardware variant that does not have the pattern of instructions present that will cause larger execution latencies.

However, newer hardware variants may optimally execute the pattern of instructions without incurring large execution latencies or bottlenecks. Therefore, newer versions of the function may include patterns of instructions that cause the older hardware variants to have greater execution latency. For example, MOVDQU SSE instruction is an unaligned move instruction. When executed on older Intel platforms, this move instruction is significantly slower than the equivalent aligned instruction, MOVDQA. On newer platforms, the instructions' latencies are nearly equivalent. Multiversioning functions may be written to only use MOVDQU on newer platforms. However, even though some versions of the function perform better on particular hardware variants, all function versions may execute on all hardware variants.

Figure 1A:
FIG. 1A is an example of a hardware platform variant, an Intel Pentium II Processor, that supports basic features.
Figure 1B:
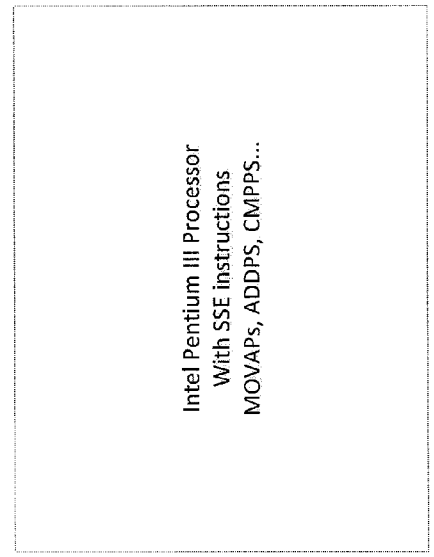
FIG. 1B is an example of a hardware platform variant, an Intel Pentium III Processor, that supports basic and advanced features that are unsupported by the hardware platform variant depicted in FIG. 1A.
Figure 3:
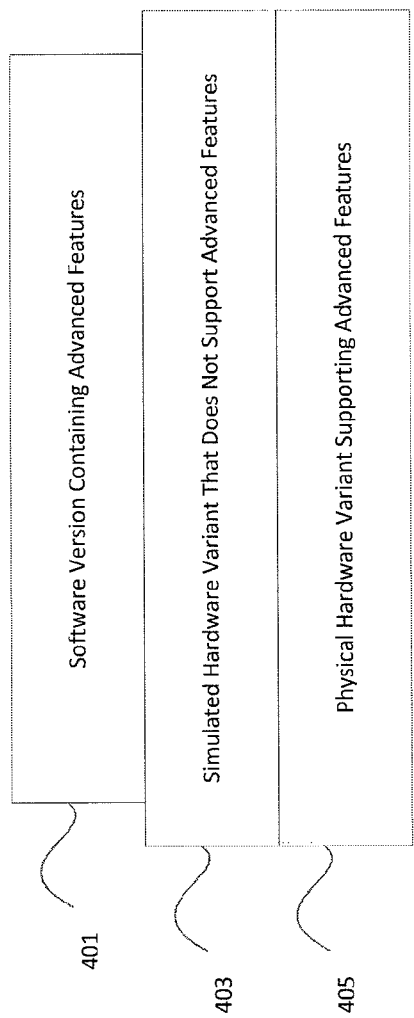
FIG. 3 is a block diagram depicting a potential test execution for a software application.

An example of a multiversioned function that has specialized versions which cannot run on older hardware variants is a function specifically designed to support newer instruction sets of a particular hardware variant as illustrated in FIG. 3. A new hardware variant may be created that incorporates newer instructions sets. For example, a hardware platform may support x86 instructions. A newer variant of the platform may support new instructions like advanced vector extensions (AVX) which are extensions to the x86 instruction set. These extensions may not be supported by older platform variants. Function versions can be generated to target the new hardware variant by including some newer instructions within the function contents.

FIG. 2 illustrates a sample of multiversioned code. As shown, the code includes multiple versions of the function "foo." For example, the default function 1, the hardware variant X, function 2, and the hardware variant Y, function 3. The default function 1 will support any hardware variant. However, function 2 is specific for hardware variant X and function 3 is specific to hardware variant Y. Function 3 may execute without a problem on hardware variant Y, but Y specific instructions may cause the application in which the function is running to crash if the function is executed on hardware variant X.

When an application executable binary that contains a multiversioned function executes on a hardware platform, a dispatcher mechanism determines whether there is a specialized version of the function for the platform. If a specialized version exists, the specialized version is executed. Otherwise, the default version of the function is executed. As illustrated in FIG. 2, function foo_X may be a specialized function version for a CPU variant supporting an instruction set architecture (ISA) X. Function foo_Y may be a specialized function version for a CPU variant supporting an ISA Y. There may also be a third generic version of foo that runs on any variant.

In FIG. 2, for example, foo_X supports basic x86 instructions and function foo_Y supports advanced x86 instructions. When a function version supporting new instructions is executed on older hardware variants which do not support the newer instructions, the application running the function version may not execute properly and may in fact crash.

As illustrated in FIG. 3, software containing advanced features (401) is run on a simulated hardware variant that does not support the advanced features (403) which in turn is run on a hardware variant supporting the advanced features (405). Advanced features of the software that are not supported by the simulation are still run by the underlying physical hardware. Therefore, this test is invalid since the functionality of the actual physical hardware overrides the functionality of the simulated platform and creates a successful run of a software test where the test should have failed.

In one embodiment, an available physical hardware variant may support all of the newer instructions that have been incorporated into function versions needing to be tested. This physical hardware variant may be used to simulate older hardware variants to test the older function versions as well as to test the newer function versions.

As discussed above, when executing multiversioned code, a software application may call a dispatcher function at runtime that decides which version of a function to execute. The dispatcher may use existing software mechanisms to detect the hardware variant on which the software application is executing and will decide the appropriate function to execute based on the hardware variant. For example, on x86 platforms, the CPUID instruction can be used to detect the type of CPU and the ISA support available. Other platforms may need more complicated solutions.

In an example embodiment there may be a testing library that can override the dispatcher's detection of the hardware. The testing library may be part of the library that provides the functions for obtaining the CPU type. Using an environment variable, the library may be asked to execute a simulation. The function that checks for the CPU type may first check whether a simulation is being run. If simulation is on, the library will return what is true for the simulated CPU. If simulation is off, the library will detect the CPU type and the ISA support. An end user or software developer may be able to make the application believe that it is running on different hardware than the hardware on which it is actually executing. This variant switching may be accomplished using a function for specifying the hardware variant type. For example, in the GNU Compiler Collection (GCC), a compiler intrinsic function such as "_builtin_cpu_is" may be used to specify a hardware variant that should be tested. By specifying the hardware variant, the compiler may use the function corresponding to the specified hardware variant rather than the function corresponding to the actual executing platform. Additionally, a flag may be provided to specify the architecture to test. Depending on the architecture specified by the flag, the application may understand that it is executing on one platform, but it is actually executing on different physical hardware. Repeated executions of the application with different user-specified hardware variants may use all possible code paths and achieve code coverage for specialized function versions.

However, one problem with this testing strategy is that software code may contain a function with some advanced ISA instructions that always gets executed, regardless of the hardware platform variation on which the code is run. If a binary executable made from the software code is tested on a hardware platform variation that does not support these advanced instructions, the executable will not execute properly and potentially crash. However, if the executable is tested using a simulated hardware platform that does not support these instructions, but the simulated hardware platform variation is run on a physical hardware platform variation that supports these instructions, the instructions may still execute because it is supported by the real physical hardware. Therefore, the simulated hardware variant would not be accurately tested.

In order to provide complete and accurate testing of a software application's function versions, an example embodiment may identify each function version at the start of the software application's execution and rewrite those functions' contents that are unsupported by the simulated hardware on which the software application is executing.

Figure 5:
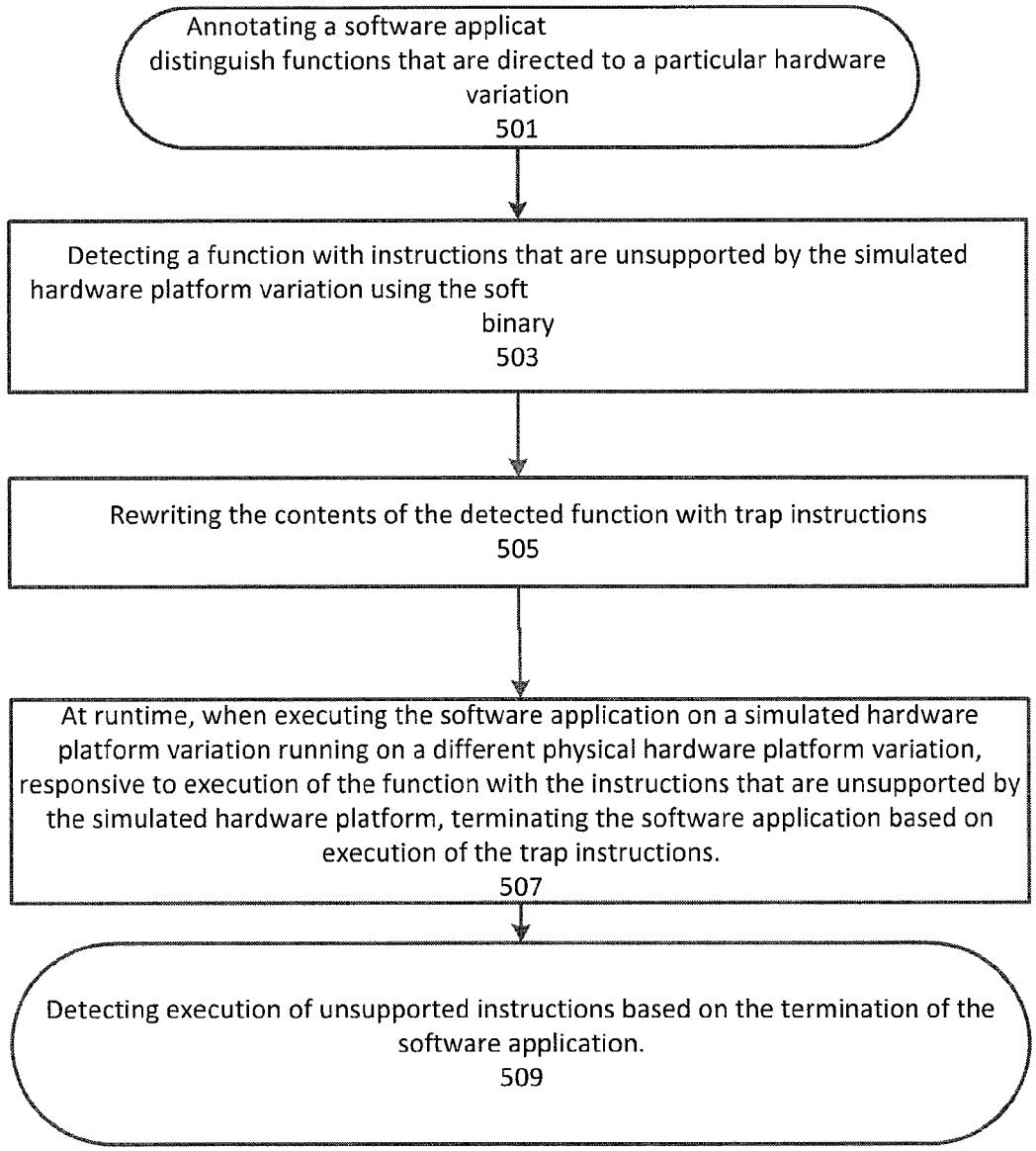
FIG. 5 is a flow diagram of an example method for detecting execution of unsupported instructions while testing multiversioned code.

An example process begins with annotating a software application's executable binary to distinguish functions that are directed to a particular hardware variation as illustrated in FIG. 5 (501). This annotation may be done by including specially named sections in each executable to identify functions that are directed towards each hardware variant. For example, there may be a section for all instructions supporting instruction set architecture (ISA) for a hardware variant, X. This section may list all functions that are designed to work on hardware supporting ISA X such as foo_X from FIG. 3. There may be another section identifying all the ISA for a hardware variant, Y, listing all functions that are designed to work on hardware supporting ISA Y. A compiler may create these sections and populate the sections with the appropriate functions. Since the compiler compiles every function, the compiler may know the ISA to which a particular function is targeted. Therefore, the compiler may easily create individual sections for each ISA and annotate the sections appropriately. When the executable is run, at startup, these special sections are read and the sections corresponding to unsupported ISA features on the simulated hardware are detected. The functions contained in these sections are rewritten with trap instructions and then execution may proceed. The instructions may only rewritten for the particular execution instance and the original executable's contents may remain unchanged. When the software application's executable binary is executed again, the binary may undergo the same process to trap unsupported ISA features. FIG. 4a is an example listing of sections created by the compiler based on the multiversioned functions of FIG. 2. FIG. 4b is an example listing of sections created by the compiler based on multiversioned functions containing AVX instructions and SSE4.1 instructions.

A function or functions with instructions that are unsupported by the simulated hardware variation on which the software application is running may be detected based on the software application's annotated executable binary (503). There may be a special piece of code that detects functions that are unsupported. This code may be a separate library or part of a dynamic loader. The code may know the ISA types supported by the different possible hardware variants that are being simulated. When the code reads the special sections in the executable, the code may identify the sections that contain functions with unsupported instructions for particular hardware variants. The code can rewrite the binary with trap instructions for these unsupported sections (505). The executable may be rewritten after it is loaded into memory leaving the contents of the executable on disk unchanged. The contents of the function(s) may be rewritten with trap instructions (505).

For example, in x86, the instruction "INT 3 with opcode 0xCC" is a trap instruction. All functions with unsupported instructions may be rewritten with "0xCC" as their contents. If the execution calls any unsupported functions, the execution may stop. When testing the software application, the software application may execute on a simulated hardware platform variation which is running on a different physical hardware platform variation. At runtime of a software application test, in order for the test to be successful, no functions that are unsupported by the simulated hardware platform variation should be executed. However, if any function with instructions that are unsupported by the simulated hardware platform variation is executed, the rewritten trap instructions may run, terminating the software application (507). Since the trap instructions are called as an application is executing, the application will terminate and a software engineer will know that there is a problem with the function versioning execution. Therefore, the test may fail and execution of unsupported instructions may be detected based on this termination and/or failure (509).

This process of annotating software applications, detecting function versions that are unsupported by the simulated hardware variation, rewriting instructions of unsupported function content, and executing the software application to determine whether there are errors in execution may be repeated for any and all available hardware platform variations in order to test all execution paths of the software application.

Figure 6:
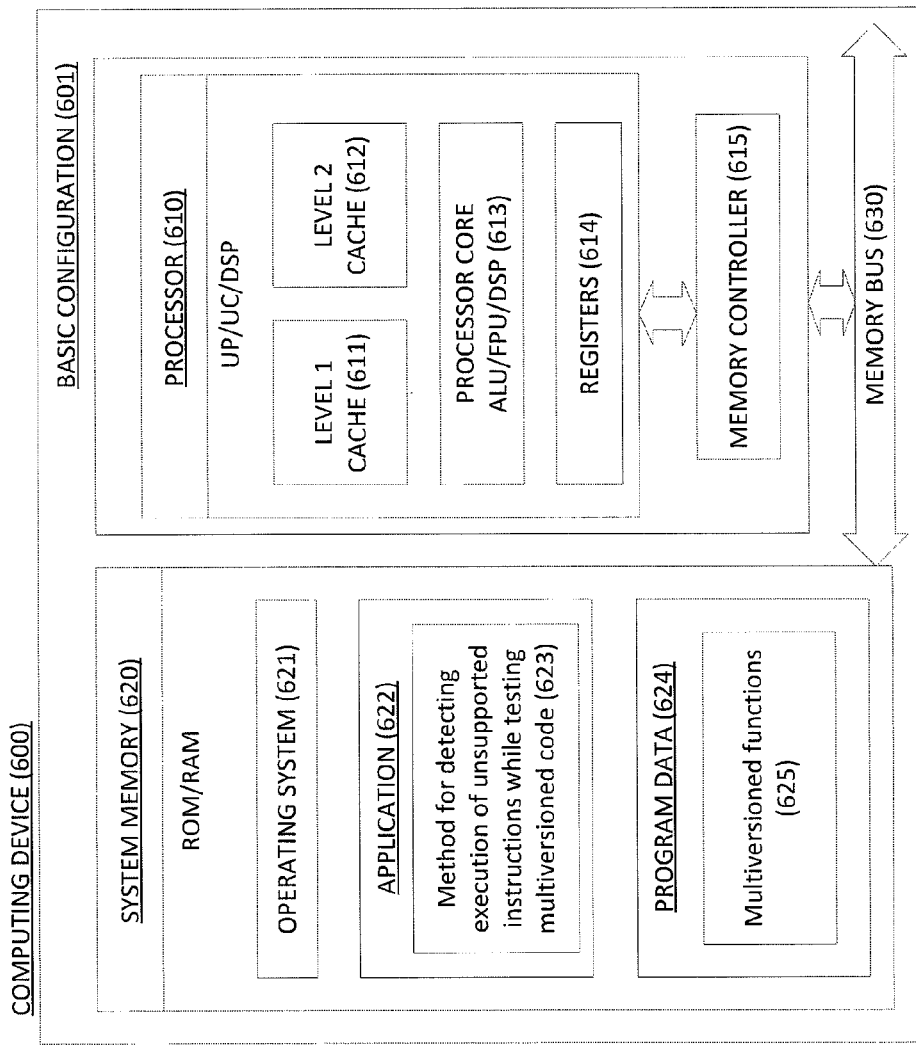
FIG. 6 is a block diagram illustrating an exemplary computing device.

FIG. 6 is a high-level block diagram of an example computer (600) that is arranged for detecting execution of unsupported instructions while testing multiversioned code on a simulated hardware platform. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method for automating testing of a software application using replicate markers. Program Data (624) includes storing instructions that, when executed by the one or more processing devices, implement a system and method for automating testing of a software application using replicate markers as well as configuration values and labels for markers. (623). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for detecting execution of unsupported instructions while testing multiversioned functions within software application code, the multiple versions of functions potentially applicable to multiple variants of the hardware to be tested by the software application, including versions that are supported by a given hardware variant while not supported by another variant, the computer-implemented method comprising:

for a particular hardware variant destined to be tested preparing the software application binary by a compiler, the preparing comprising:

annotating, using the compiler, the software application's executable binary to distinguish functions of the multiple versions that are directed to the particular hardware variant;

detecting a function among the annotated functions by the preparing compiler, as containing instructions that are deemed unsupported by the hardware platform variant on which the software application's annotated executable binary will run as part of the simulation test;

rewriting, using a pre-runtime binary modification module subsequent to the detection stage, the contents of the detected function with trap instructions;

at runtime, when executing the software application on the simulated hardware platform variation running on a different physical hardware platform variation, responsive to execution of the function with instructions that are unsupported by the simulated hardware platform, terminating the software application based on execution of the trap instructions; and detecting execution of unsupported instructions based on the termination of the software application.

2. The computer-implemented method of claim 1, wherein annotating a software application's executable binary is done by creating specially named sections to denote functions by hardware platform variation and listing each function directed to the specific hardware platform variation under its corresponding named section.

3. The computer-implemented method of claim 2, wherein detecting a function with instructions that are unsupported by the simulated hardware platform variation using the software application's annotated executable binary includes using a special piece of code that identifies the sections that contain functions with unsupported instructions for the simulated hardware platform variation.

4. The computer-implemented method of claim 1, further comprising repeating the execution of the software application using different simulated hardware platform variations until all execution paths have been executed and tested.

5. The computer-implemented method of claim 1, wherein a trap instruction is an interrupt or an exception.

6. The computer-implemented method of claim 1, wherein rewriting the contents of the detected function with trap instructions is done after the software application's annotated executable binary is loaded into memory leaving the contents of the executable binary on disk unchanged.

7. The computer-implemented method of claim 1, wherein annotating a software application's executable binary to distinguish functions that are directed to a particular hardware variation is done by a compiler.

8. The computer-implemented method of claim 1, further comprising:
   calling a dispatcher function at run-time that determines which version of a function to execute based on the simulated hardware platform variation on which the software application is executing.

9. The computer-implemented method of claim 1, further comprising:
   prior to detecting a function with instructions that are unsupported by a simulated hardware platform variation on which the software application's annotated executable binary will run, determining whether a simulation is being run and
   responsive to determining that a simulation is being run, determining the simulated hardware platform variation.

10. A system for detecting execution of unsupported instructions while testing multiversioned functions within software application code, the multiple versions of functions potentially applicable to multiple variants of the hardware to be tested by the software application, including versions that are supported by a given hardware variant while not supported by another variant, the system comprising:
   one or more processing devices; and
   one or more storage devices storing instructions that, when executed by the one or more processing devices, cause the one or more processing devices to:
      for a particular hardware variant destined to be tested, prepare the software application binary by a compiler, the preparing comprising:
         annotating, using the compiler, the software application's executable binary to distinguish functions of the multiple versions that are directed to the particular hardware variant;
         detecting a function among the annotated functions by the preparing compiler, as containing instructions that are deemed unsupported by the hardware platform variant on which the software application's annotated executable binary will run as part of the simulation test;
      rewriting, using a pre-runtime binary modification module subsequent to the detection stage, the contents of the detected function with trap instructions;
      at runtime, when executing the software application on the simulated hardware platform variation running on a different physical hardware platform variation, responsive to execution of the function with instructions that are unsupported by the simulated hardware platform, terminate the software application based on execution of the trap instructions; and
      detect execution of unsupported instructions based on the termination of the software application.

11. The system of claim 10, wherein annotating a software application's executable binary is done by creating specially named sections to denote functions by hardware platform variation and listing each function directed to the specific hardware platform variation under its corresponding named section.

12. The system of claim 11, wherein detecting a function with instructions that are unsupported by the simulated hardware platform variation using the software application's annotated executable binary includes using a special piece of code that identifies the sections that contain functions with unsupported instructions for the simulated hardware platform variation.

13. The system of claim 10, further comprising repeating the execution of the software application using different simulated hardware platform variations until all execution paths have been executed and tested.

14. The system of claim 10, further comprising repeating the execution of the software application using different simulated hardware platform variations until all execution paths have been executed and tested.

15. The system of claim 10, wherein a trap instruction is an interrupt or an exception.

16. The system of claim 10, wherein rewriting the contents of the detected function with trap instructions is done after the software application's annotated executable binary is loaded into memory leaving the contents of the executable binary on disk unchanged.

17. The system of claim 10, wherein annotating a software application's executable binary to distinguish functions that are directed to a particular hardware variation is done by a compiler.

18. The system of claim 10, further comprising executing instructions that:
   call a dispatcher function at run-time that determines which version of the function to execute based on the simulated hardware platform variation on which the software application is executing.

19. The system of claim 10, further comprising executing instructions that:
   prior to detecting a function with instructions that are unsupported by a simulated hardware platform variation on which the software application's annotated executable binary will run, determines whether a simulation is being run and
   responsive to determining that a simulation is being run, determines the simulated hardware platform variation.

20. A non-transitory computer-readable medium having stored therein computer executable code that causes one or more processors to execute the steps of:
  for a particular hardware variant destined to be tested, preparing the software application binary by a compiler, the preparing comprising:
  annotating, using the compiler, a software application's executable binary to distinguish functions that are directed to particular hardware variant, the software application code containing multiple versions of functions potentially applicable to multiple variants of the hardware to be tested by the software application, including versions that are supported by a given hardware variant while not supported by another variant;
  detecting a function among the annotated functions by the preparing compiler, as containing instructions that are deemed unsupported by the hardware platform variant on which the software application's annotated executable binary will run as part of the simulation test;
  rewriting the contents of the detected function with trap instructions;
  at runtime, when executing the software application on the simulated hardware platform variation running on a different physical hardware platform variation, responsive to execution of the function with instructions that are unsupported by the simulated hardware platform, terminating the software application based on the execution of the trap instructions; and
  detecting execution of unsupported instructions based on the termination of the software application.

* * * * *